United States Patent [19]

Claussen et al.

[11] Patent Number: 5,007,942
[45] Date of Patent: Apr. 16, 1991

[54] LIGHT-POLARIZING FILMS OR SHEETS CONTAINING STILBENE DYESTUFFS

[75] Inventors: Uwe Claussen, Leverkusen; Friedrich W. Kröck, Odenthal, both of Fed. Rep. of Germany

[73] Assignee: Bayer Aktiengesellschaft, Leverkusen, Fed. Rep. of Germany

[21] Appl. No.: 450,757

[22] Filed: Dec. 14, 1989

[30] Foreign Application Priority Data

Dec. 23, 1988 [DE] Fed. Rep. of Germany ....... 3843417
Jul. 1, 1989 [DE] Fed. Rep. of Germany ....... 3921669

[51] Int. Cl.$^5$ .......................... D06P 5/00; F21V 9/14; C09K 19/00
[52] U.S. Cl. .......................... 8/506; 8/648; 8/687; 252/585; 428/1; 350/398
[58] Field of Search .......................... 8/648, 687, 506; 252/585; 428/1, 414; 534/689, 691

[56] References Cited

U.S. PATENT DOCUMENTS

| 3,981,558 | 9/1976 | Oh et al. | 428/1 |
| 4,007,077 | 2/1977 | Yaguchi | 428/1 |
| 4,396,646 | 8/1983 | Schuler et al. | 8/489 |
| 4,514,559 | 4/1985 | Sato et al. | 534/690 |
| 4,774,141 | 9/1988 | Matsui et al. | 428/414 |

FOREIGN PATENT DOCUMENTS

| 182632 | 5/1986 | European Pat. Off. |  |
| 56-06430 | 1/1981 | Japan | 252/585 |
| 145255 | 8/1984 | Japan |  |
| 156759 | 8/1985 | Japan |  |
| 159705 | 8/1985 | Japan |  |
| 168743 | 9/1985 | Japan |  |
| 230606 | 11/1985 | Japan |  |
| 8703707 | 5/1987 | Japan |  |
| 70702 | 3/1989 | Japan | 252/585 |
| 1183602 | 7/1989 | Japan | 252/585 |
| 2144760 | 3/1985 | United Kingdom | 252/585 |

OTHER PUBLICATIONS

M. M. Zwick, J. Appl. Polym. Sci., 9, 2393–2423, (1965).
cf. W. Hanle, H. Scherer, Zeitschr. Naturforsch., 6a, 437–439, (1951).
cf. S. Y. Zherdeva et al., J. Org. Chem., USSR, 16, (1980), 383–390.
Houben-Weyl, Methoden der Organischen Chemie (Methods of Organic Chemistry), vol. 10/3, Part 3, pp. 428, 429.
Houben-Weyle, Methoden der Organischen Chemie (Methods of Organic Chemistry), vol. 10/3, Part 3, 339–346.
Chemical Abstracts, Band 104, Nr. 10, 1986, Seite 53, Zusammenfasung Nr. 69953w, Columbus, Ohio, U.S.A.; & JP-A-60 168 743, (Nippon Kayaku Co., Ltd.), 02-09-1985.

Primary Examiner—Paul Lieberman
Assistant Examiner—J. E. Darland
Attorney, Agent, or Firm—Sprung Horn Kramer & Woods

[57] ABSTRACT

Light-polarizing films or sheets, preferably based on vinyl alcohol homopolymers or copolymers contain dyestuffs of the formula

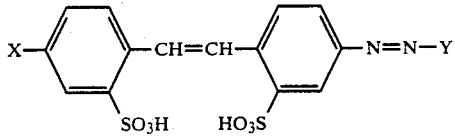

in which X and Y have the meanings given in the description.

6 Claims, No Drawings

LIGHT-POLARIZING FILMS OR SHEETS CONTAINING STILBENE DYESTUFFS

The invention relates to stilbene dyestuffs and light-polarizing films or sheets containing stilbene dyestuffs.

Films based on polyvinyl alcohol (PVA) containing iodine or dichroic dyestuffs as polarizing agents are known.

Until now, it has been very predominantly the iodine-containing polarizers which have found industrial applications, for example in passive liquid crystal displays for the visualization of information. In the absence of moisture, these polarizers are characterized by excellent light fastness and outstanding dichroic properties in the long-wave region of the visible spectrum. The active agent of these films is the iodine/PVA complex (M. M. Zwick. J. Appl. Polym. Sci. 9, 2393–2424 (1965)), which admittedly absorbs a wide band of the daylight spectrum, but not all of it. In the short-wave region, a "hole", i.e. a region of diminished extinction, is present, which is the reason that the sheets have a characteristic blue colour.

This has disadvantageous consequences, if it is desired to produce white light. The light transmitted in unpolarized form diminishes the dichroism and thus the polarization performance in this region. To increase it again, it is necessary to increase the concentration of iodine complex. However, this correction in the short-wave region results in excessive extinction in the long-wave region. This leads to a significant decrease of the transmitted light in the transmission setting in combination with a decrease in the brightness of the display which is equipped with this sheet. To achieve acceptable degrees of brightness, compromises must be made.

An important critical parameter of a display is its readability under various illumination conditions; it is usually stated as "perceived contrast ratio" ($PCR = T\perp / T\parallel$); this ratio should be as large as possible. From this follows that the transmission on the one hand has to made as small as possible in the blocked setting ($T\parallel$) (readability in the dark) and, on the other hand as large as possible in the transmission setting ($T\perp$) (readability in the light). This requires a very uniform polarizing performance of the filter over the entire spectral range, which can usually not be achieved by means of the iodine sheet.

There has not been a lack of attempts to replace iodine by dyestuff triples of dichroic dyestuffs to produce a neutral grey colour having a uniform dichroism. However, this requires a range of high-performance dyestuffs. In addition to good light and weather fastness, they must have a high extinction and a high dichroism in the matrix; in addition, they must not have secondary densities which have lower dichroism. Thus, preferably polyazo dyestuffs have been proposed, for example based on 4 nitro-4' stilbenedisulfonic acid (JA 59/145,255, JA 60/156,759, JA 60/168,743) or of substituted benzidine.

In addition, numerous individual dyestuffs have been mentioned, for example Direct Red 2, 31, 81, Direct Orange 26, 107, Direct Green 85, Direct Blue 1, 106, 107, 109, 190, 202, Direct Black 17, 19, Direct Yellow 12,44 etc. (JA 60,230,606, JA 60/159,705, EP 182, 632). However, although dichroism is a wide-spread property with dyestuffs (cf. H. Hanle, H. Scherer, Zeitschr. Naturforsch. 6a, 437–439 (1951)), it has so far not been possible to achieve or surpass the spectral properties of the iodine sheet. This can be attributed, on the one hand, to the lack of good blue shades, and, on the other hand, to the requirement of high dichroism of the system dyestuff/matrix.

Surprisingly, it has now been found that certain novel stilbene dyestuffs have excellent dichroic properties and are highly suitable for the production of light-polarizing films or sheets.

(In what follows, a definition of a radical or index once given is maintained in the further text).

The invention relates to light-polarizing films or sheets containing dyestuffs which, in the form of their free acid, conform to the formula

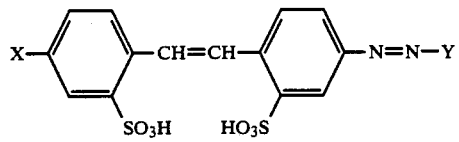

in which

X signifies —CN, —CF$_3$, halogen, —NH$_2$, —NHR$^1$, —NR$^1$R$^2$, R$^1$CONH—, —COOH, —CONH$_2$, —CONHR$^1$, —CONR$^1$R$^2$, —COOR$^1$, —OH, —OR$^1$, —O—CO—R$^1$, —N=N—Y$^1$, or a substituted or unsubstituted heterocyclic radical, R$^1$, R$^2$ signify alkyl, cycloalkyl, aryl or aralkyl, which may be interrupted by O and/or S, and Y, Y$^1$ signify a substituted or unsubstituted aryl or heterocyclic radical, in particular

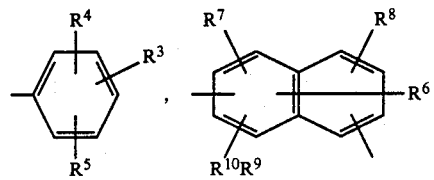

in which

R$^3$ signifies H, —OH, —OR$^1$, —NH$_2$, —NHR$^1$, —NR$^1$R$^2$, —NH—COR$^1$, —O—COR$^1$, —N=N—R$^{11}$, a heterocyclic radical, R$^4$, R$^5$, R$^7$, R$^8$, R$^9$, R$^{10}$ signify H, halogen, —OH, —OR$^1$, —NH$_2$, —NHR$^1$, —NR$^1$R$^2$, —R$^1$, —SO$_3$H, —NH—CO—R$^1$, —O—CO—R$^1$, —SO$_2$—NH$_2$, —SO$_2$—NHR$^1$, —SO$_2$—NR$^1$R$^2$, R$^6$ signifies H, —N=N—R$^{11}$, heterocyclic radical and R$^{11}$ signifies a substituted or unsubstituted aryl radical, preferably a substituted or unsubstituted phenyl or naphthyl radical or a substituted or unsubstituted heterocyclic radical containing a maximum of eight azobridges.

Preferred radicals Y, Y$^1$ and R$^{11}$ of the benzene series are as follows:

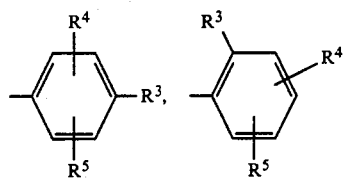

In particular, suitable radicals are those which are derived from phenol and aniline and its substitution products, if appropriate subsequently alkylated or acylated. Examples are:

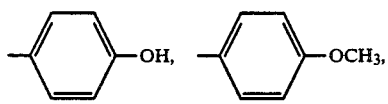

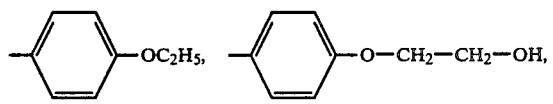

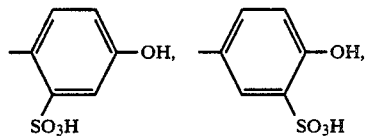

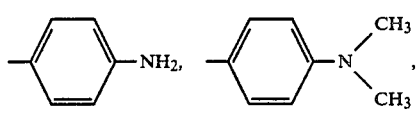

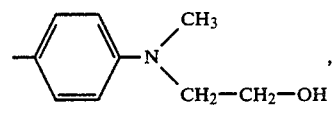

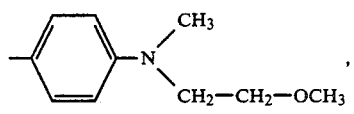

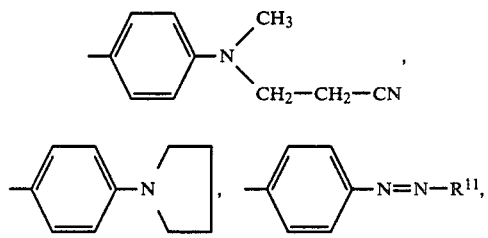

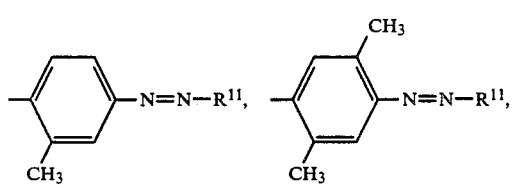

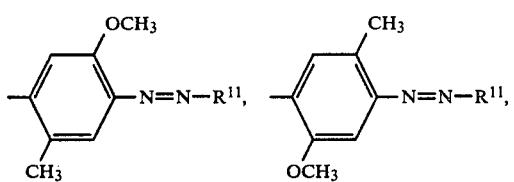

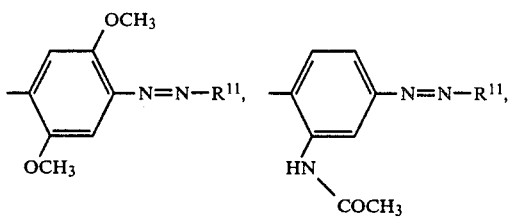

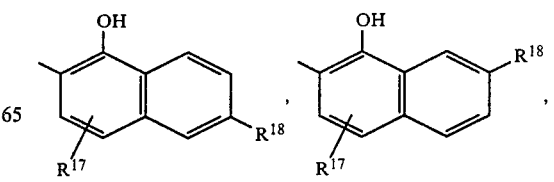

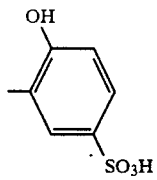

Preferred radicals Y, $Y^1$ and $R^{11}$ of the naphthalene series are listed below:

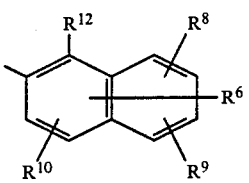

$R^{12} = -OH, -NH_2$

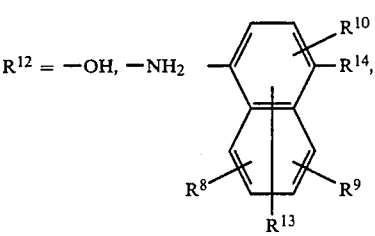

$R^{13}$ is H, if $R^{14} = -N=N-R^{11}$ or H, and is $-N=N-R^{11}$, if $R^{14} = -OH, -NH_2$,
$R^{14}$ is $-OH, -NH_2, -N=N-R^{11}$,

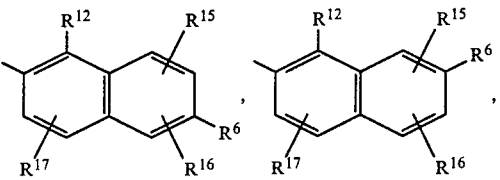

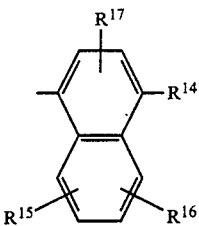

$R^{15}, R^{16}$ are H, $-OH$, $-OR^1$, $-O-COR^1$, $-NH_2$, $-NH-R^1$, $-NR^1R^2$, $-NH-CO-R^1$, $-SO_3H$,
$R^{17}$ is H, $-SO_3H$.

In particular, the following radicals Y, $Y^1$ and $R^{11}$ of the naphthalene series are preferred:

-continued

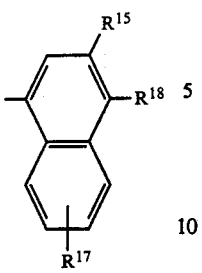

$R^{18}$ is H, OH, NH$_2$, —NH—CO—R$^1$, —NH—R$^1$, —N=N—R$^{11}$, —SO$_3$H,

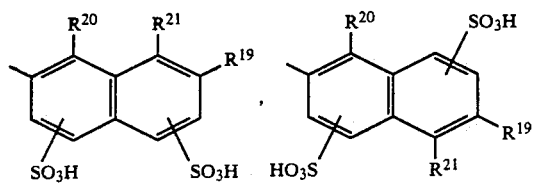

$R^{19}$ is H, —N=N—R$^{11}$,
$R^{20}$, $R^{21}$ are OH, NH$_2$, —O—CO—R$^1$, —NH—CO—R$^1$,

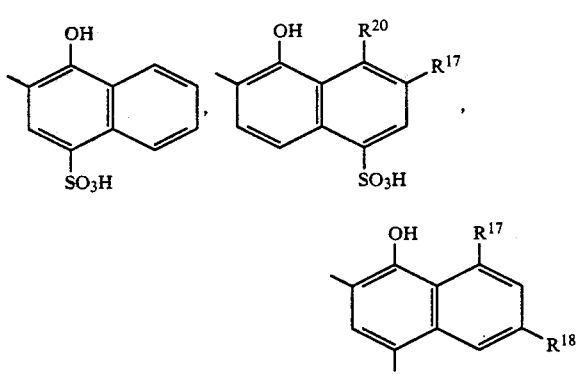

Preferably, Y, Y$^1$ and R$^{11}$ are derived from the (substituted) I acid:

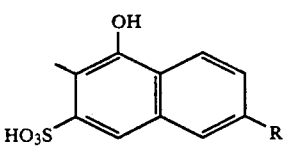

R is —NH—R$^1$, —NH—CO—R$^1$, —N=N—R$^{11}$,
Halogen preferably represents F, Cl, Br, I.
Alkyl (R$^1$, R$^2$) preferably represents C$_1$-C$_6$-alkyl (methyl, ethyl).
Cycloalkyl (R$^1$, R$^2$) preferably represents C$_3$-C$_7$-cycloalkyl (cyclopentyl, cyclohexyl).
Aryl (R$^1$, R$^2$) preferably represents phenyl and naphthyl.
Aralkyl (R$^1$, R$^2$) preferably represents phenyl-C$_1$-C$_4$-alkyl (benzyl, phenethyl).
Suitable substituents for the alkyl and cycloalkyl radicals (R$^1$, R$^2$) are, for example, halogen (Cl, Br, F), —OH, —CN, C$_1$-C$_4$-alkoxy and the like.
Suitable substituents for the aryl and aralkyl radicals (R$^1$, R$^2$) are, for example, halogen (Cl, Br, F), —OH, C$_1$-C$_4$-alkoxy (methoxy), C$_1$-C$_4$-alkyl (methyl), CF$_3$, NO$_2$, CN.

Preferred radicals X, R$^3$ and R$^6$ of the heterocyclic series have the formula:

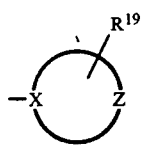

in which
X is a C or an N atoms, where the free valence of carbon has been saturated by a double bound, and
Z represents the remaining members of a preferably 5- or 6-membered moncyclic or bicyclic or tricyclic ring
which can contain 1 to 3 heteroatoms from the series consisting of N, O, S and is substituted or unsubstituted.

In particular, they are derived from the following heterocyclic systems: triazole, pyrazole, benzotriazole, napththotriazole, oxazole, imidazole, thiazole, oxadiazole.

Preferred radicals Y, Y$^1$ and R$^{11}$ of the heterocyclic series have the formula

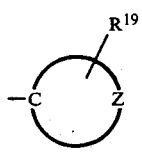

in which
Z represents the remaining members of a preferably 5- or 6-membered monocyclic or bicyclic or tricyclic ring,
which can contain 1 to 3 heteroatoms from the series consisting of N, O, S and is substituted or unsubstituted, the free valence of carbon being saturated by a double bond.

In particular, Y, Y$^1$ and R$^{11}$ are derived from the following heterocyclic systems: thiophene, triazole, pyrazole, pyridine, benzotriazole, pyridone, naphthotriazole.

In addition, R$^{11}$ is derived from the following heterocyclic systems: thiadiazole, thiazole, benzothiazole.

Suitable heterocyclic radicals (Y, Y$^1$ and R$^{11}$) are in particular a substituted 5-amino- or 5-hydroxypyrazole radical, for example

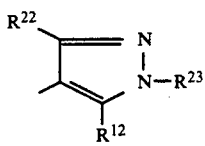

in which
R$^{22}$ is H, C$_1$-C$_4$-alkyl (methyl), —COOH,
R$^{23}$ is

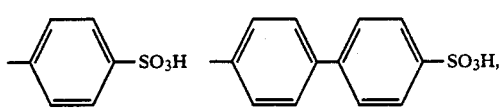

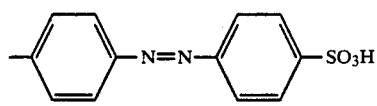

Further preferred radicals Y, Y¹ and R¹¹ are those of the formula:

(A—N=N)$_p$L in which
- A is a substituted or unsubstituted pheylene or naphthalene radical,
- L is a substituted or unsubstituted phenyl or naphthyl radical and
- p is 1, 2, 3.

In particular, A represents

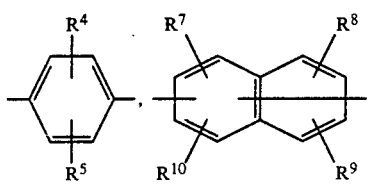

and L represents

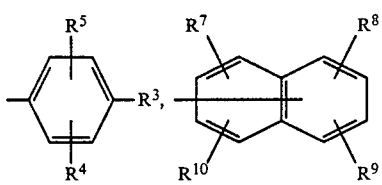

Preference is given to the group of symmetrical compounds of the formula

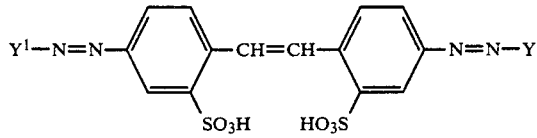

in which Y¹ is Y.

A further preferred group of compounds conforms to the formula

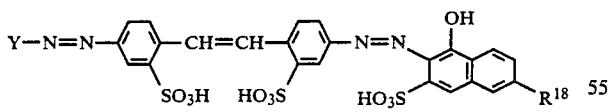

A further preferred group of compounds conforms to the formula

A further preferred group of compounds conforms to the formula

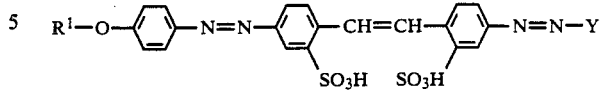

Dyestuffs I can be prepared in analogy to processes known from the literature.

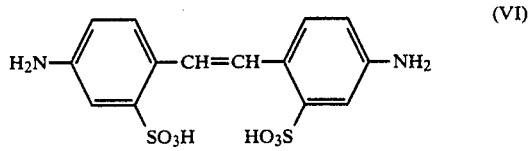

which can be tetrzotized and coupled onto coupling components serves as starting material. Free amino groups of the coupled products obtained can be diazotized and coupled again.

The compound

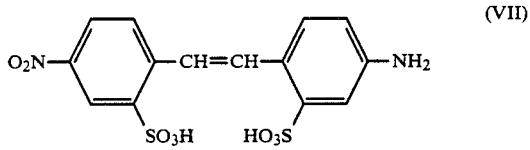

can be used for preparing unsymmetrical dyestuffs. To this end, VII is diazotized and coupled onto suitable coupling components. Free amino groups of the coupled products obtained can be diazotized and coupled again.

The nitro group of the dyestuffs obtained can be reduced, and the amino compound obtained can be diazotized and coupled onto suitable coupling components. This makes the unsymmetrical compounds of the formula I accessible.

The monoamino compound VII can be converted according to Sandmeyer to the corresponding halogen, CN or OH compounds etc. (cf. S. Y. Zherdeva et al., J. Org. Chem. USSR 16 (1980) 383) or, for example, to various derivatives (triazoles, pyrazoles etc.). After reduction of the nitro group, the monoamino compounds obtained can be coupled, after diazotization, to give azo dyestuffs.

Compound VII can furthermore be acylated at the amino group in a known manner (acetylated, benzoylated); subsequent reduction of the nitro group gives amino-containing intermediates, for example

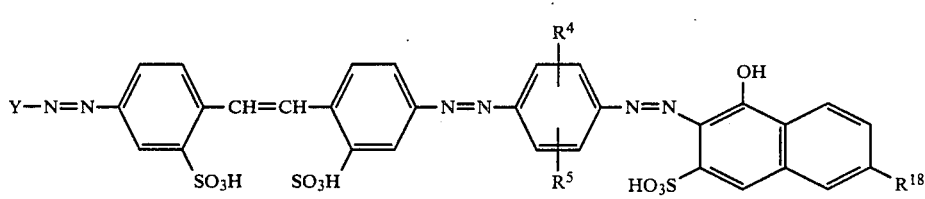

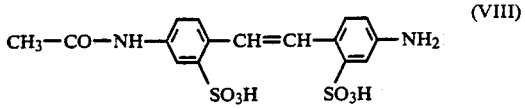

which like VII are suitable for the preparation of unsymmetrical dyestuffs. In particular, they can be diazotized and coupled onto suitable coupling components. After elimination of the acyl group, the dyestuffs obtained can be diazotized and coupled again. Compound VIII like VII can be converted according to Sandmeyer to derivatives which, after elimination of the acyl group, can be diazotized and coupled to give azo dyestuffs.

In particular, the invention relates to light-polarizing films (sheets) which contain an organic polymer and one or more compounds of the formula I.

The organic polymer is preferably an oriented polymer which forms transparent films and is compatible with dyestuffs which contain acidic groups. Examples of such a polymer are: polyamides, cellulose (acetate), vinyl alcohol homopolymers and copolymers and vinyl acetate homopolymers and copolymers, where the comonomers present can be, for example, ethylene, propylene, crotonic acid, (meth)acrylic acid, maleic acid. Polyvinyl alcohols which have been prepared by complete or partial hydrolysis of polyvinyl acetate, in particular those types which have a viscosity of $>4$ mPa.sec$^2$, preferably 20 to 70 mPa.sec$^2$, at 20° C. in 4% strength aqueous solution and a hydrolysis degree of $>80$ mole %, preferably 85 to 100 mole %, are preferably used.

The films preferably have a thickness of 10 to 150$\mu$.

The films preferably contain 0.01 to 10% by weight, particularly preferably 0.5 to 6% by weight, relative to the weight of the film, of the dyestuff.

The films are coloured in the usual manner, for example by colouring the polymer which is dissolved (in water).

The film is prepared from the solution in a manner known per se.

It is recommended to free the dyestuffs or dyestuff salts before use of foreign salts, for example by recrystallization, extraction and/or dialysis.

Preferably, these sheets are used which have been stretched at elevated temperature, preferably at 80°–160° C., by 200 to 1000%.

If desired, the dyestuff-containing films can also be subjected to an aftertreatment, for example with aqueous boric acid solution, in order to improve the light permeability or the polarization coefficient. The conditions under which this aftertreatment is carried out can vary, depending on the film material and dyestuff. Preferably, a 1–15% strength by weight, particularly preferably a 5–10% strength by weight, boric acid solution is used at 30°–80° C., particularly preferably at 50°–80° C. Preferably, surfactants and, if desired, inorganic salts are added to the boric acid solution. The surfactants can be nonionic, cationic or anionic; preferably, they are nonionic.

Examples of nonionic surfactants are: addition products of ethylene oxide with higher alcohols or addition products of ethylene oxide with nonylphenol. Preferably, 0.005–0.5% by weight, particularly preferably 0.02–0.2% by weight, of surfactant is used, relative to the water.

Suitable inorganic salts are preferably sodium sulphate and furthermore potassium sulphate, sodium chloride, potassium chloride, sodium nitrate, potassium nitrate. Relative to the water, preferably 0.1–5% by weight, particularly preferably 0.3–3% by weight, of inorganic salts are used. If desired, this can be followed by a fixation treatment with an aqueous solution of a high-molecular-weight cationic compound.

The light-polarizing films or sheets can be compounded or laminated with other materials in a manner known per se. Examples of suitable protective coatings are sheets made of a tetrafluoroethylene/hexafluoroethylene copolymer or another fluorohydrocarbon resin, a polyester, polyolefine or polyamide resin, a polycarbonate or cellulose ester, preferably- cellulose (tri)acetate, cellulose (tri)propionate, cellulose (tri)butyrate.

The dichroism of the system can be considerably enhanced by addition of lower mono- or polyhydric alcohols, such as methanol, ethanol or glycol, glycerol, trimetholethane, trimethylolpropane, pentaerythritol, sorbitol, their ethers, such as glycol monomethyl ether, glycol monoethyl ether, glycol dimethyl ether, diglycol diethyl ether, lower amines such as propylamine, hydroxy amines, such as propanolamine or amides, such as DMF, N-methylpyrrolidone, pyrrolidone, $\epsilon$-caprolactam, to the casting solution. The additives can be used alone or, more advantageously, in mixtures, in which lower monohydric alcohols, for example methanol, ethanol, i-propanol, can also be present as components of the mixture. The additives are preferably added to the casting solution in amounts of 5–50% by weight, relative to the casting solution.

Besides being used in light-polarizing films, the dyestuffs of the formula I can be used alone or in mixtures for rendering ordered structures visible in the analysis of polymers and in biological materials.

EXAMPLE 1

(a) Synthesis of the dyestuff:

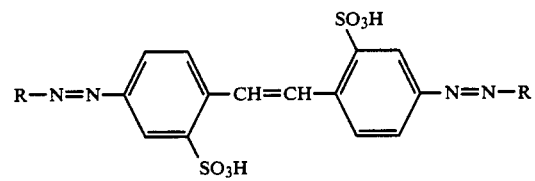

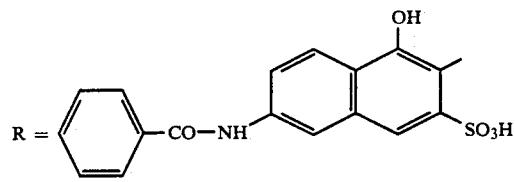

37 g (0.1 M) of 4,4'-diaminostilbene-2,2'-disulphonic acid are suspended in 1 l of water. 83 ml of concentrated hydrochloric acid are added and 51 ml (0.22 M) of sodium nitrite solution (as an approximately 30% strength solution) are added dropwise slowly at room temperature. The suspension is stirred overnight. After this time, it should be possible to detect a nitrite excess which is destroyed by the addition of sulphamic acid solution. This tetrazonium salt solution is slowly added dropwise at room temperature, while controlling the pH, to a solution of 69 g (0.2 M) of 1-hydroxy-6-benzoylaminonaphthalene-3-sulphonic acid in 0.5 l of water, the pH being maintained between 6.5 and 7 by dropwise addition of 10 per cent strength sodium hydroxide solution. After stirring overnight, the precipitated dyestuff is filtered off with suction and washed several times with small portions of water. The dyestuff is then dissolved in water and subjected to dialysis, to separate off salts; the dyestuff solution obtained is then evaporated, and the residue is dried. Yield: 98.7 g.

(b) Manufacture of the sheet 9.9 g of ®MOWIOL 28-99 (hydrolyzed polyvinyl acetate; degree of hydrolysis 99.4±0.4 mole %; viscosity of the 4% strength aqueous solution at 20° C.:28±2.0 mPa.sec$^2$; from Hoechst AG) and 0.1 g of the dye of Example 1a are dissolved in 190 ml of water by heating the mixture at 90° C. for 2 hours with stirring. 5 g of methanol and 2.5 g of glycerol are added to 92.5 g of the 1% strength, relative to the polymer, dyestuff solution obtained. By means of a knife, 500μ thick layers are applied from this solution to a clean glassplate, and the layers thus obtained are dried in air at room temperature on a support in an exactly horizontal position. The resulting dry sheets are peeled off from the glassplate; they have a violet colour and are about 40–50μ thick.

(c) Stretching of the sheets

To produce dichroic properties, the sheets are stretched. To this end, they are heated in a drying cabinet at a constant temperature of 130° C. for 15 minutes and then stretched at a speed of about 10 cm/min to about 700% of their original length. The stretched sheets have a dichroic ratio of about 28 at the absorption maximum (557 nm), measured with polarized light; losses due to reflection were not taken into account in the measurement.

(d) Sheet manufacture on the casting machine 0.2 g of the dyestuff of Example 1a is dissolved in 100 g of hot water. 10 g of glycerol are added, and 19.8 g of- ®MOWIOL 28-99 are stirred into the cooled solution. After stirring at room temperature for 1 hour, the mixture is heated to 90° C., and stirring is continued at this temperature until, after about 3 hours, a homogenous solution has been formed. At 50° C., 5 g of methanol are then stirred in. The warm solution is filtered through a filter press, while injecting air, and is then degassed by evacuation. The casting solution is pourable and stable at 30° C.

To produce a sheet, the casting solution is applied continuously by means of 250μ knife to the casting wheel (wheel diameter 25 cm, rotating speed about 7.5 min per revolution) which has been preheated to about 50° C. The layer is dried by passing heated air over it, and the solidified sheet is continuously peeled off the wheel and additionally dried. The sheet obtained is about 40μ thick. It is stretched as described above in (c), leading to similar results.

(e) Exactly analogously as in Example 1a, analogous dyestuffs are obtained by using the coupling components mentioned, which are incorporated into sheets according to 1b. Stretching according to 1c gives dichroic sheets.

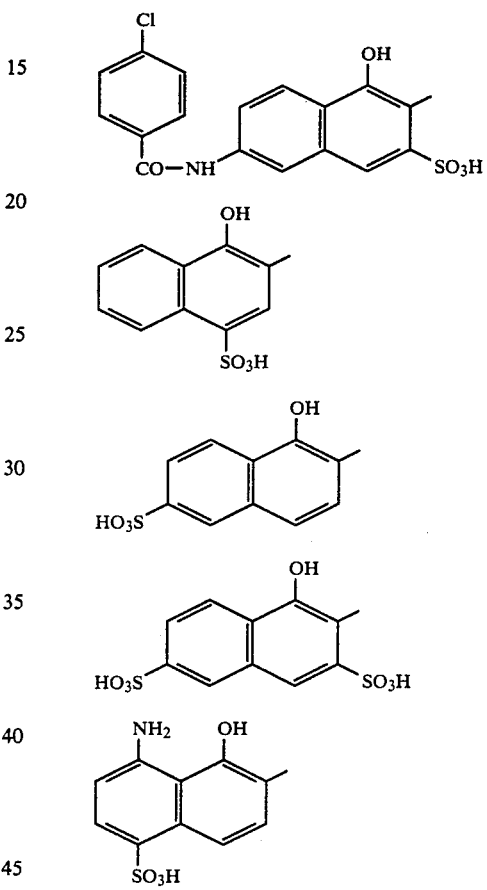

Further dyestuffs are prepared analogously to Example 1a from the following coupling components:

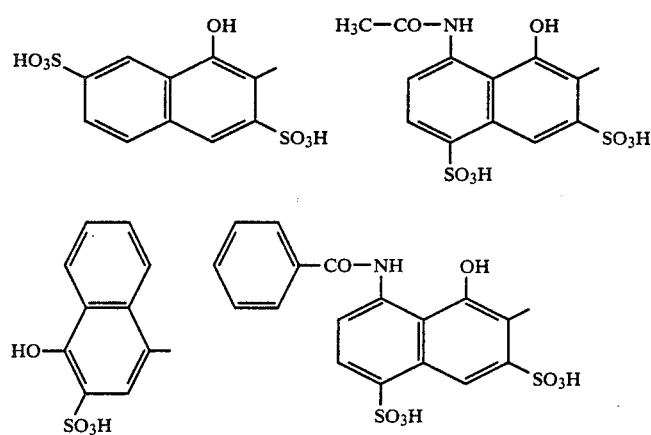

-continued
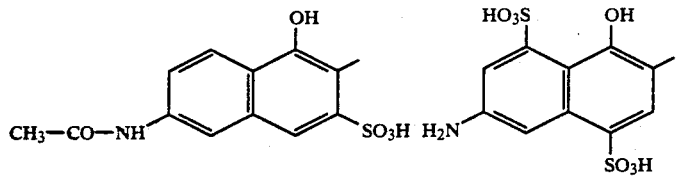
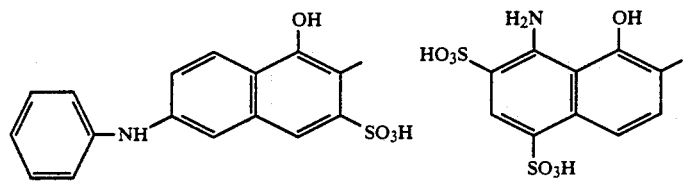
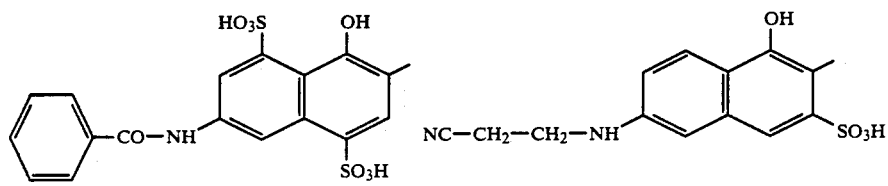
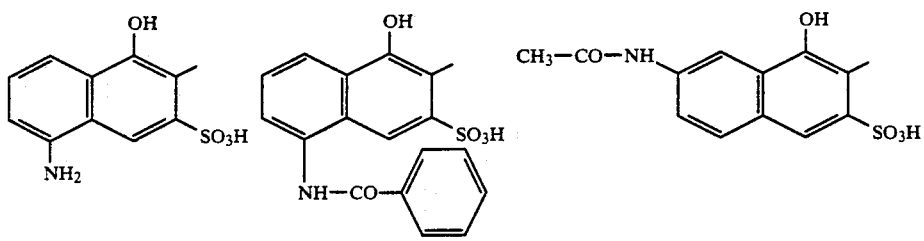
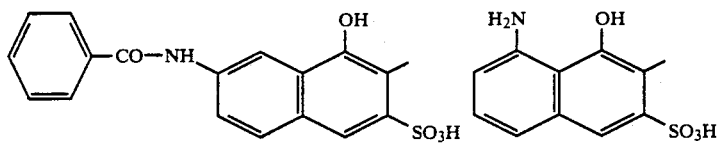
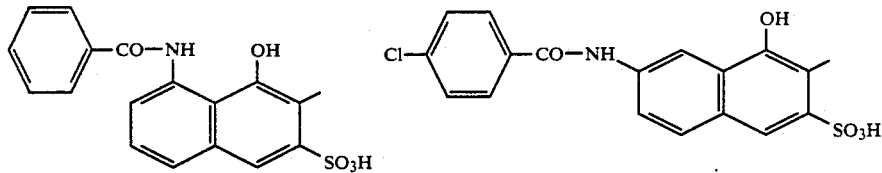
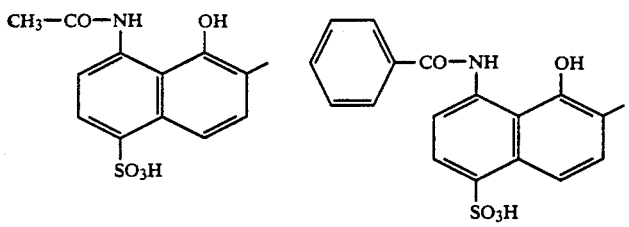
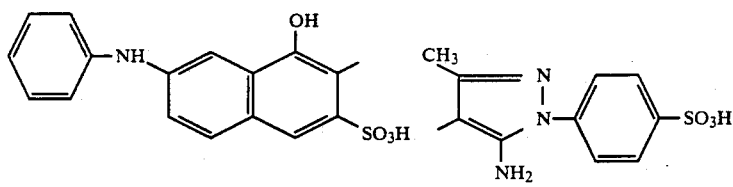

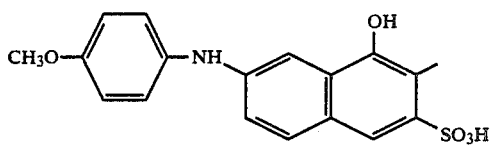

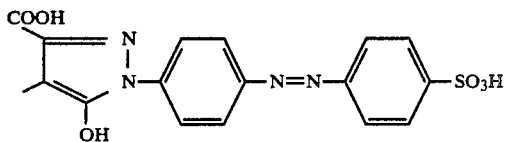

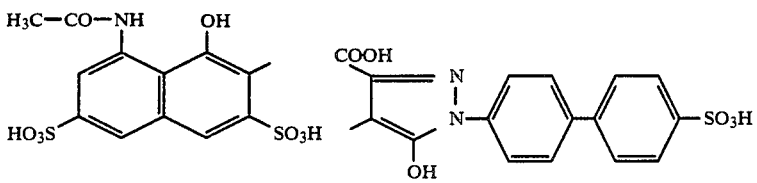

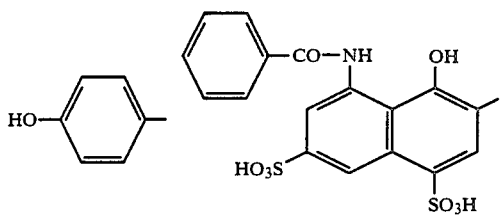

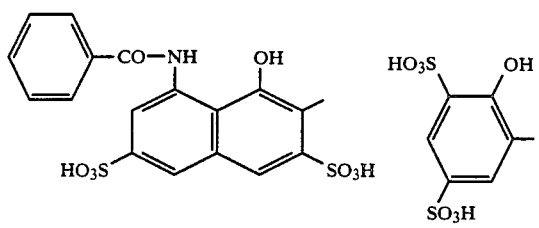

The products obtained from the coupling onto phenols can be "sealed" by subsequent alkylation (methylation, ethylation, benzylation).

EXAMPLE 2

(a) 17.3 g (0.1 mol) of 4-aminobenzenesulphonic acid are dissolved in 200 ml of water together with about 7 ml of sodium hydroxide solution (45% strength), and 28 ml of concentrated hydrochloric acid are then added all at once. The freshly precipitated suspension is diazotized at 5°–10° C. with 7 g of sodium nitrite in 15 ml of water. After 15 minutes, the product is filtered off with suction and washed on the filter with icewater. The moist product is immediately stirred into 100 ml of water (caution: the dry product is explosive). To the suspension of the diazonium salt thus obtained is added dropwise, with vigorous stirring, a cold solution of 34.1 g (0.1 mol) of 8-amino-1-hydroxy-naphthalene-3,6-disulphonic acid monosodium salt and 5.5 g of sodium carbonate in 100 ml of water over a period of 45 minutes. The mixture is stirred for 12 hours while warming to room temperature, the product is filtered off with suction and washed neutral. This gives a dyestuff paste of the formula:

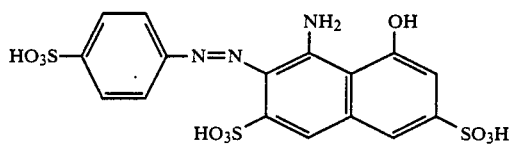

(b) The dyestuff paste from (a) is dissolved together with 40 g of sodium carbonate in about 500 ml of water, if necessary with heating, and then cooled to below 10° C. The tetrazonium salt solution from 18.5 g (0.05 mol) of 4,4'-diaminostilbene-2,2'-disulphonic acid prepared according to Example 1a is added dropwise to the suspension obtained over a period of 30 minutes, while maintaining the pH at 6.5 to 7 by metering in 10% strength sodium hydroxide solution. The mixture is stirred overnight, the dyestuff is filtered off with suction, washed neutral with water and then dissolved in water and dialyzed, to separate off salts. The dyestuff solution is evaporated and the residue is dried. The dyestuff obtained has the structure:

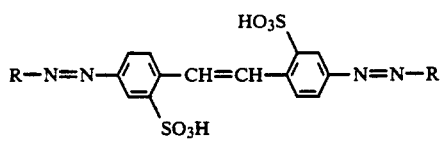

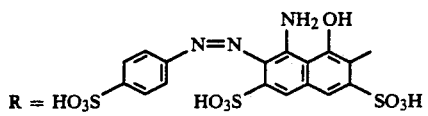

(c) The following coupling components which can be prepared analogously to (2a) can also be used:

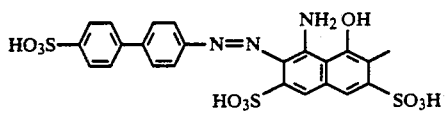

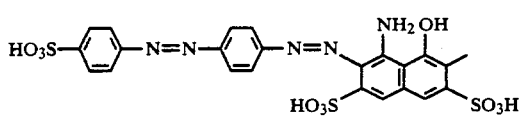

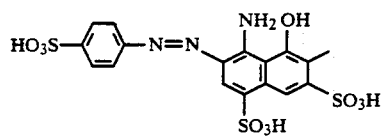

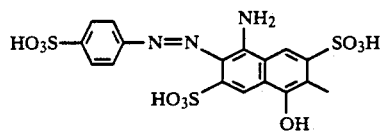

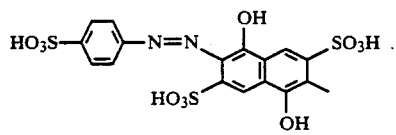

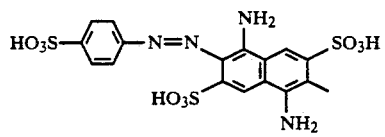

(d) Exactly analogously, the dyestuff of the structure:

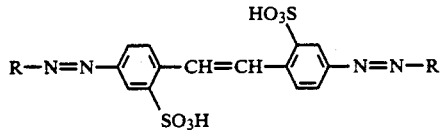

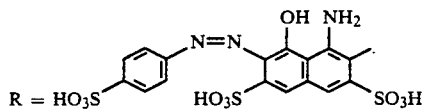

is obtained by coupling the tetrazonium salt solution of Example 1a first at a pH of 4.5–5.5 onto 1-hydroxy-8-aminonaphthalene-3,6-disulphonic acid and then coupling the diazonium compound from 4-amino-benzene-sulphonic acid prepared according to Example 2a twice onto the product at a pH of 7–7.5.

The other components mentioned in (c) can also be reacted in reverse order to give analogous dyestuffs.

EXAMPLE 3

(a) At a maximum temperature of 10° C., a solution of 30.6 g (0.2 mol) of 2,5-dimethoxyaniline in 500 ml of water (to which concentrated hydrochloric acid is added until a clear solution is formed) is added dropwise to the tetrazonium salt solution prepared according to Example 1a, with stirring, while maintaining a pH of 3 to 4.5 by simultaneous metering in of sodium hydroxide solution. After stirring overnight and warming to room temperature, the coupling reaction is completed. The product is filtered off with suction and carefully washed neutral with water. The dyestuff obtained after drying weighs 52.4 g and has the formula:

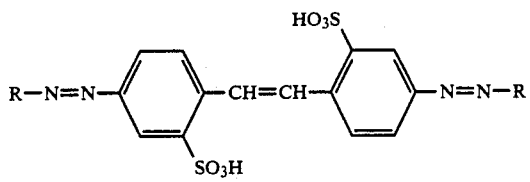

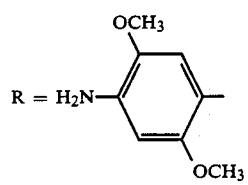

Instead of 2,5-dimethoxyaniline, it is also possible to use 2-methoxy-5-methylaniline, 2,5-dimethylaniline, 3-methylaniline, 3-acetylaminoaniline, 1-naphthylamine, 1-amino-2-ethoxy-naphthalene-6-sulphonic acid or anilinometanesulphonic acid etc.

(b) The intermediate product obtained in (a) is tetrazotized in aqueous hydrochloric acid with sodium nitrite while letting it stand overnight at room temperature, and the tetrazonium salt solution obtained, after destruction of the nitrite excess, is coupled onto 1-hydroxy-6-benzoylamino-naphthalene-3-sulphonic acid at a pH of 6.5 to 8. The dyestuff obtained has the formula:

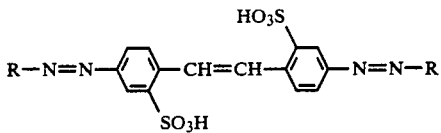

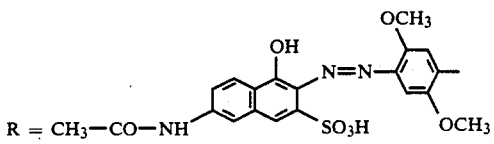

(c) The other compounds mentioned in Example 1e and 2c can also be used as components of the final coupling reaction, preferably benzoyl I acid, acetyl gamma-acid or acetyl K acid; phenolic coupling components can subsequently be "sealed" by alkylation. The dyestuffs obtained are incorporated according to Example 1b into a sheet, which is subsequently stretched.

EXAMPLE 4

(a) 9.6 g (0.01 mol) of the dyestuff from Example 1e formed by coupling of the tetrazonium salt from 1a onto 1-hydroxy-6-acetylaminonaphthalene-3-sulphonic acid are stirred in 200 ml of 2 N sodium hydroxide solution at 80° C. until the acetyl groups have been completely cleaved off (monitoring of the reaction by thin-layer chromatography). The reaction mixture is neutralized, cooled, and is filtered off with suction and the residue washed neutral.

(b) The dyestuff formed according to (a) is dissolved in 100 ml of 1 N sodium hydroxide solution, 1.8 g of sodium nitrite are added to the solution, and the solution is then run into excess hydrochloric acid. After standing overnight at room temperature, the tetrazonium salt solution has been formed; excess nitrite is destroyed by means of sulphamic acid, 2 g of phenol dissolved in sodium hydroxide solution are then added dropwise, and the pH is brought to about 9 with sodium hydroxide solution. After stirring for 3 hours, the coupling reaction is completed. The product is filtered off with suction and washed neutral.

(c) The dyestuff formed according to (b) is dissolved in 100 ml of 1 N sodium hydroxide solution, and 4 g of dimethyl sulphate ar added to the solution with stirring. After about 1 hour, the methylation is completed. The product is filtered off with suction, washed neutral and dried. The dyestuff obtained has the formula:

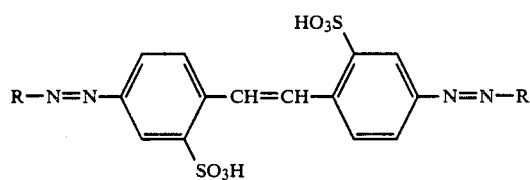

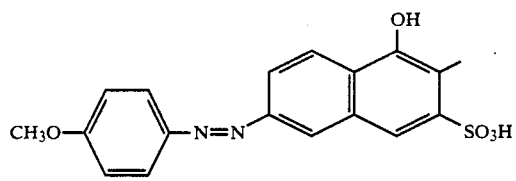

Instead of dimethyl sulphate, it is also possible to convert the phenolic groups with diethyl sulphate or benzyl bromide to the ethers.

Instead of phenol in (4b), it is also possible to use the other coupling components listed in Tables 1e and 2c as end groups.

EXAMPLE 5

(a) The tetrazonium salt solution from Example 1a is added dropwise at about 10° C. to the solution of 68.4 g (0.2 mol) of 1-hydroxy-8-acetylaminonaphthalene-3,6-disulphonic acid (monosodium salt) in 0.8 l of water, during which the pH is maintained at 6.5–7.5 by dropwise addition of 2 N sodium hydroxide solution. The coupling reaction is then allowed to go to completion overnight, while heating to room temperature. The product is filtered off with suction, washed neutral with water and dried. Yield: 62.5 g of a blue-violet soluble dyestuff.

(b) 20 g of the dyestuff from (5a) are heated in 200 ml of 2 N sodium hydroxide solution at about 80° C., until the acetyl groups have been cleaved off. The mixture is then acidified with hydrochloric acid, the product is filtered off with suction, washed neutral and dried. This gives 15.3 g of a dyestuff which, in the form of the free acid, has the following formula:

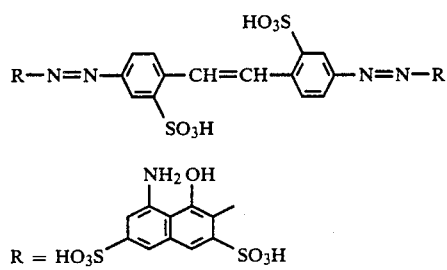

An analogous dyestuff is also obtained from 1-hydroxy-8-acetylaminonaphthalene-3,5-disulphonic acid, followed by cleavage.

The dyestuffs can be incorporated according to Example 1b into a sheet and stretched according to 1c.

"Unsymmetrical" dyestuffs

A suitable intermediate for the preparation of "unsymmetrical" compounds is 4-amino-4,-nitrostilbene-2,2'-disulphonic acid.

EXAMPLE 6

(a) 21.2 g (0.05 mol) of 4-amino-4'-nitrostilbene-2,2'-disulphonic acid are suspended in 400 ml of water, and 40 ml of concentrated hydrochloric acid are added. Diazotization is carried out by dropwise addition of 12.8 ml of 30% strength sodium nitrite solution (0.05 mol+10%) at a maximum temperature of 10° C., and stirring is then continued at about 20° C. overnight. The nitrite excess is then destroyed by addition of sulphamic acid.

The diazonium salt solution obtained is added dropwise to a solution of 17.2 g (0.05 mol) of 1-hydroxy-6-benzoylaminonaphthalene-3-sulphonic acid in 160 ml of water at about 20° C., during which the pH is kept in the range from 7 to 8 by dropwise addition of sodium hydroxide solution.

After stirring overnight, the precipitated dyestuff is filtered off with suction, washed neutral with a small amount of water and dried. Yield: 28.5 g (75%). This gives a dyestuff of the structure:

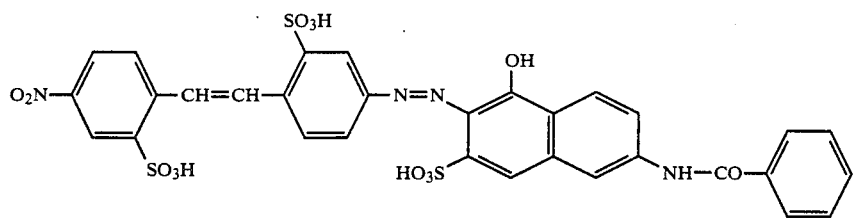

Exactly analogously as described above, an analogous dyestuff is obtained by replacing 1-hydroxy-6-benzoylaminonaphthalene-3-sulphonic acid by 1-hydroxy-6-anilinonaphthalene-3-sulphonic acid.

(b) Further suitable coupling components are the ones mentioned in the Table of Examples 1e and 2c, preferably acetyl I acid, acetyl gamma-acid, K acid, acetyl K acid, benzoyl K acid, acetyl H acid, benzoyl H acid, Chicago SS acid, benzoyloxy C acid or phenol. The dyestuffs obtained according to (a) or (b) can be incorporated in accordance with Example 1b in a sheet which is stretched in accordance with Example 1c.

In addition, they can be reduced as described in (9a) to the amino compounds, which are diazotized and then coupled onto suitable coupling components, for example those the Tables of Examples 1e and 2c.

EXAMPLE 7

(a) 4-Benzoylamino-4'-nitrostilbene-2,2'-disulphonic acid:

200 g (0.5 mol) of 4-amino-4'-nitrostilbene-2,2'-disulphonic acid are suspended in 1 l of water, and the mixture is brought to a pH of 9 with 40% strength sodium hydroxide solution. At about 10° C., 77 g (0.5 mol+10%) of benzoyl chloride are added dropwise with vigorous stirring, during which the pH is maintained at 9 by dropwise addition of sodium hydroxide solution. As soon as the pH remains stable, stirring at room temperature is continued for 1 hour, the product is filtered off with suction, washed neutral and dried. This gives 233 g.

(b) 4-Amino-4'-benzoylaminostilbene-2,2'-disulphonic acid:

151 g (0.3 mol) of the product from (a) are suspended in 2.5 l of water, 100 g of 45% strength sodium hydroxide solution and 200 g of sodium sulphide trihydrate are added, and the mixture is slowly heated to 80° C. until the starting material has disappeared (TLC). 200 g of sodium chloride are added to the hot solution. After cooling, the product is filtered off with suction and washed carefully neutral with water. The dry product weighs 113 g.

(c) Diazotization of 4-amino-4'-benzoylaminostilbene-2,2'-disulphonic acid in accordance with the procedure of Example 6a, destruction of the nitrite excess with sulphamic acid, and coupling of the product onto 1-hydroxy-6-benzoylaminonaphthalene-3-sulphonic acid, while maintaining a pH of 7-8, gives a dyestuff of the structure:

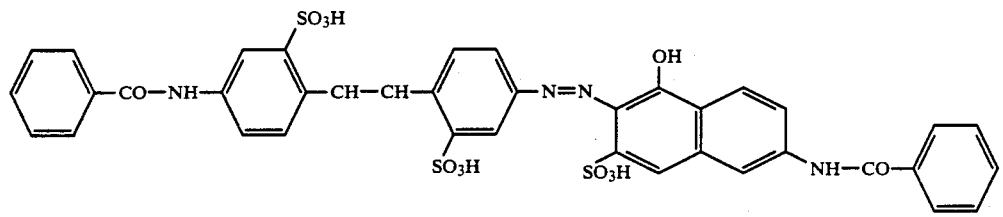

The corresponding dyestuff which has an acetylamino group on the stilbene radical is obtained analogously.

Further suitable coupling components are the ones mentioned in Examples 1e and 2c, preferably phenyl I acid, acetyl K acid, benzoyl K acid, acetyl gamma-acid, acetyl H acid, benzoyl H acid, Chicago SS acid and phenol (followed by methylation). The dyestuffs obtained can be incorporated in accordance with Example 1b in a sheet which is stretched in accordance with Example 1c.

EXAMPLE 8

(a) At a maximum temperature of 10° C., a solution of 7.8 g (0.05 mol) of 2,5-dimethoxyaniline in 125 ml of water (dissolved with the concentrated hydrochloric acid addition until a clear solution is formed) is added dropwise to the diazonium salt solution prepared according to Example 6a, with stirring, while maintaining a pH of 3 to 4.5 by metering in sodium hydroxide solution. After stirring overnight, during which the temperature is allowed to rise to room temperature, the coupling reaction is completed. The product is filtered off with suction and carefully washed neutral with water.

Instead of 2,5-dimethoxyaniline, it is also possible to use 2-methoxy-5-methylaniline, 2,5-dimethylaniline, 3-methylaniline, 3-acetylaminoaniline, 1-naphthylamine, 1-amino-2-ethoxynaphthalene-6-sulphonic acid etc.

(b) The intermediate obtained in (a) is diazotized in the form of a paste in aqueous hydrochloric acid with sodium nitrite, the diazotization being allowed to go to completion by standing overnight and warming to room temperature. Excess nitrite is destroyed by means of sulphamic acid.

The diazonium salt solution is coupled onto 1-hydroxy-6-anilinonaphthalene-3-sulphonic acid at pH 6.5 to 7.5. The dyestuff obtained has the formula:

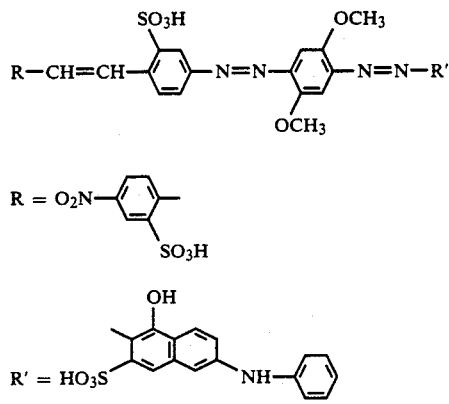

It is also possible to use the other compounds mentioned in Examples 1e and 2c as components of the end coupling.

(c) Exactly analogously as described in 8a and b, the dyestuff of the formula

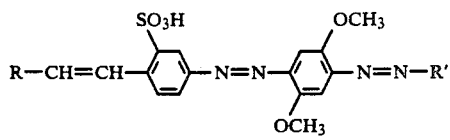

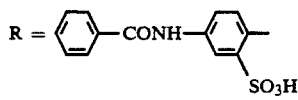

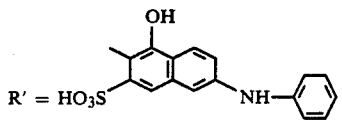

is obtained by using the diazonium salt from Example 7c.

It is also possible to use the other compounds mentioned in Examples 1e and 2c as components of the end coupling.

If benzoyl chloride in Example 7a is replaced by other active acid derivatives, for example acetic anhydride, propionic anhydride, 4-methylbenzoyl chloride etc., and the procedure according to 7b and then according to 7c and 8c is repeated, analogous dyestuffs in which the benzoyl group is replaced correspondingly are obtained.

EXAMPLE 9

(a) The dyestuff of Example 6a which still contains a nitro group is reduced in an ethanol/water mixture with sodium sulphide or analogously to the procedure in DOS (German Patent Specification) 3,805,513, Example 3, to the amino compound. Another possible reduction is that using iron powder in weakly acidic aqueous medium according to Bechamp.

Exactly analogously, the corresponding nitro-containing dyestuffs of Example 6b can be reduced to the amino compounds.

(b) 18.1 g (0.025 mol) of the dyestuff obtained in (a) are suspended in 300 ml of water, 20 ml of concentrated hydrochloric acid are added, and the mixture is diazotized by dropwise addition of 6.4 ml of 30% strength sodium nitrite solution (0.025 M+10%) at a maximum temperature of 10° C., and stirring is allowed to continue overnight at room temperature. The nitrite excess is then destroyed by addition of sulphamic acid.

The diazonium salt solution obtained is added dropwise to a solution of 8 g (0.025 mol) of 1-amino-8-hydroxynaphthalene-2,4-disulphonic acid in 80 ml of water at about 20° C., while maintaining the pH at about 7. After stirring overnight, the precipitated dyestuff is filtered off with suction, washed with a small amount of water and dried. The dyestuff obtained has the structure:

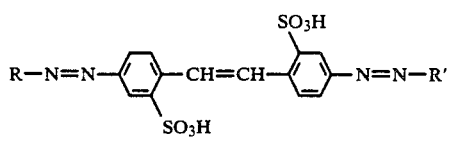

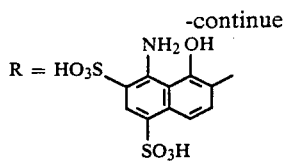

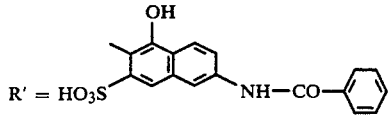

It is also possible to use the other compounds mentioned in Examples 1e and 2c as coupling components.

The same reaction sequence 9a, b can also be carried out with the dyestuff from Example 8b and its analogues. This dyestuff is also obtained by deacylating the dyestuff from Example 8c with 2 N hydrochloric acid or 2 N sodium hydroxide solution at about 80° C. and diazotizing and coupling the intermediate thus obtained as described in 9b.

EXAMPLE 10

(a) 5 g (about 0.05 mol) of phenol are dissolved in 100 ml of water with the addition of sodium hydroxide solution, until a clear solution has been obtained, and the diazonium salt solution obtained in Example 6a is then added dropwise at about 10° C., during which a pH of about 9 is maintained by addition of sodium hydroxide solution. After stirring overnight, the mixture is neutralized, the precipitate filtered off with suction and washed.

The moist paste is reacted analogously to the procedure in Example 4c in aqueous alkaline solution with dimethyl sulphate, until complete methylation has taken place. This gives a dyestuff of the structure:

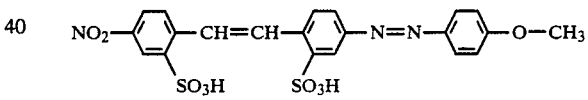

Likewise, other (substituted) phenols can also be used instead of phenol. If dimethyl sulphate is replaced by benzyl bromide, the corresponding benzylated compound is obtained; other alkylating agents, for example diethyl sulphate, are also suitable.

(b) The dyestuff obtained in (a) is reduced with sodium sulphide in ethanol and water or with iron powder in weakly acidic medium to the amine. This amine is diazotized analogously to Example 6a with sodium nitrite, and excess nitrite is then destroyed by means of sulphamic acid. The diazonium salt solution obtained is coupled in accordance with the further procedure in Example 6a onto 1-hydroxy-6-benzoylaminonaphthalene-3-sulphonic acid at a pH between 7 and 8, which gives a dyestuff of the formula below:

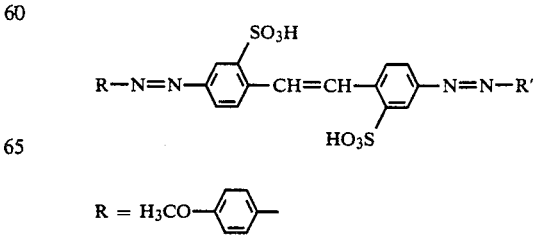

(a) The preparation of the following dyestuff is described there on page 343:

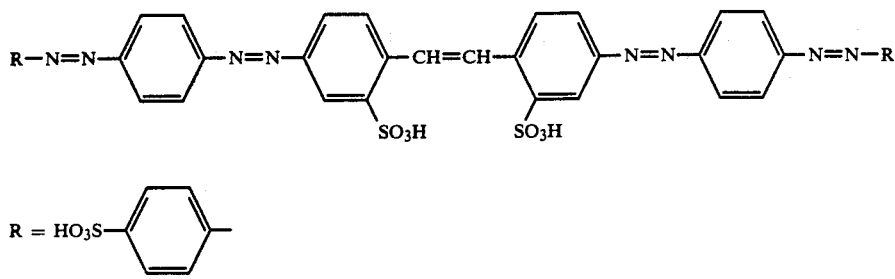

(b) The following dyestuffs are prepared by suitable modification of the procedure given there:

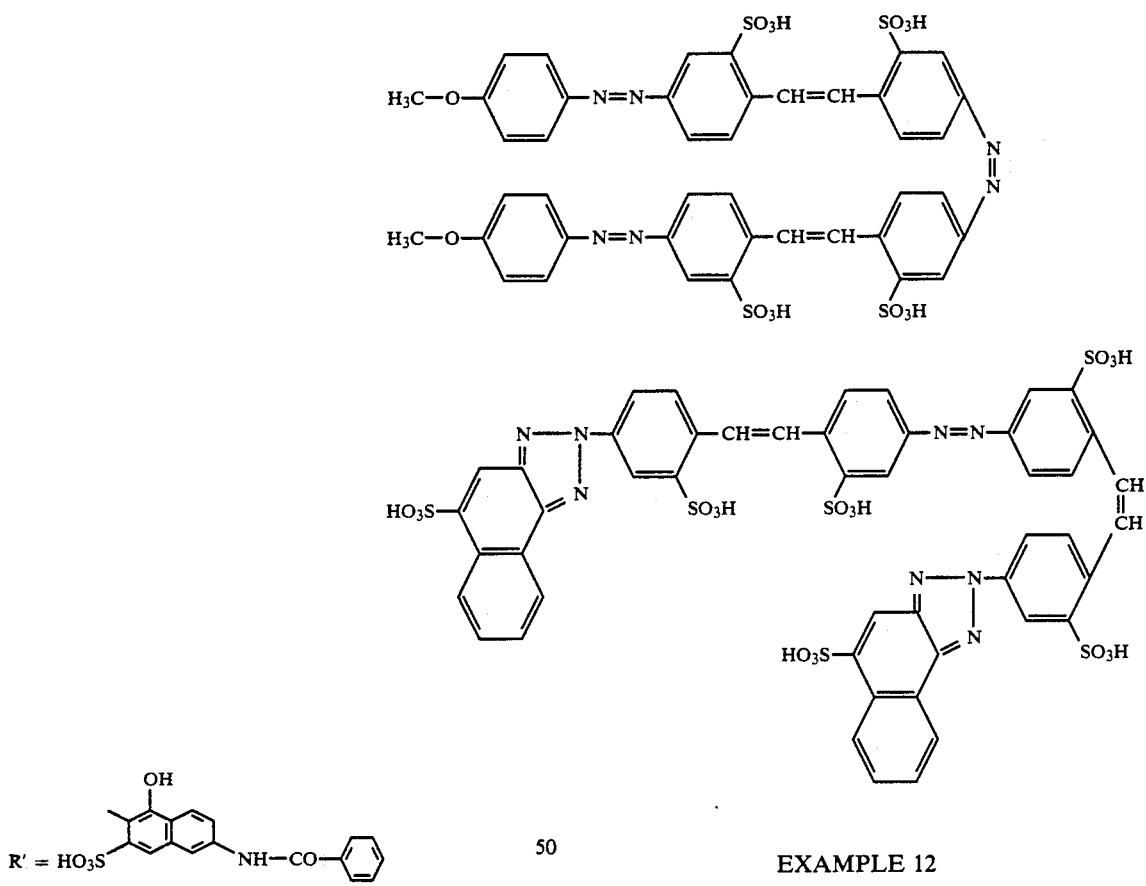

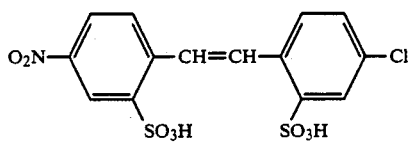

It is also possible to use the other compounds mentioned in Examples 1e and 2c as components of the end coupling, preferably acetyl I acid, N-phenyl I acid and acetyl H acid.

The dyestuffs obtained are incorporated according to Example 1b into a sheet, which is subsequently stretched.

The dyestuffs obtained according to (a) or (b) can be incorporated in accordance with Example 1b in a sheet which is stretched in accordance with Example 1c.

EXAMPLE 11 (Condensation dyestuffs)

The condensation reaction for the preparation of azo dyestuffs is described in Houben-Weyl, Methoden der Organischen Chemie (Methods of organic chemistry), Vol. 10/3, Part 3, p. 339–346.

EXAMPLE 12

(a) The compound is prepared by the procedure in J. Org. Chem. USSR 16 (1980) 388.

Exactly analogously, it is also possible to prepare the corresponding bromine compound or the cyanide instead of the chlorine compound.

(b) The compound of Example 12a is reduced analogously to the procedure in Example 7b, 10b or in J. Org. Chem., USSR 16 (1980) 386, 389 to the amino compound. This compound is converted into the corresponding diazonium salt, for example as described in 6a, and then as also described in 6a, coupled onto 1-hydroxy-6-benzoylaminonaphthalene-3-sulphonic acid, while maintaining a pH of about 7–8. This gives the dyestuff of the structure:

en-Weyl, Methoden der Organischen Chemie (Methods of Organic Chemistry), Vol. 10/3, Part 3, p. 428, 429:

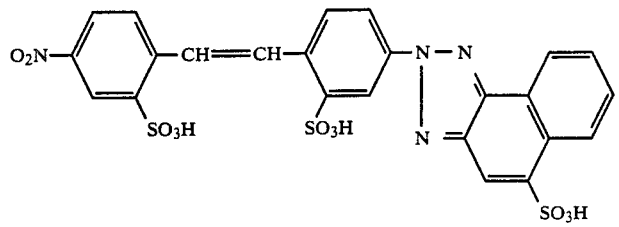

is reduced analogously to the procedure of Examples 7b, 10b or 12b to the amino compound.

The compound which is an isomer with respect to the position of the sulpho group is obtained analogously by coupling onto 2-aminonaphthalene-6-sulphonic acid, followed by reduction to the amino compound.

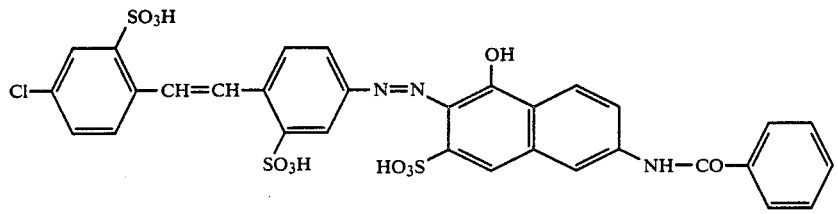

Further suitable coupling components are those mentioned in Tables 1e and 2c.

(c) If the procedure of Example 8 is repeated and the diazonium salt solution prepared in 12b is used instead of that used in 8a, and the product is first coupled onto 3-methylaniline and then onto 1-hydroxy-6-anilinonaphthalene-3-sulphonic acid, a dyestuff of the structure:

(b) The amino compound prepared in (a) is diazotized according to the procedure in Example 6a, and the product is coupled as described there onto 1-hydroxy-6-anilinonaphthalene-3-sulphonic acid. This gives a dyestuff of the structure:

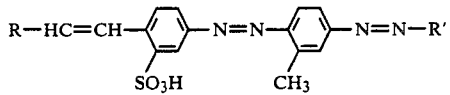

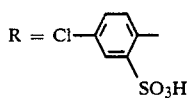

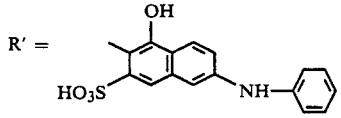

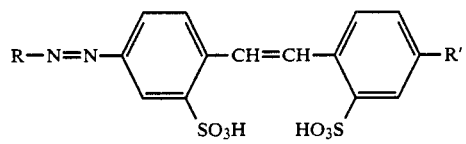

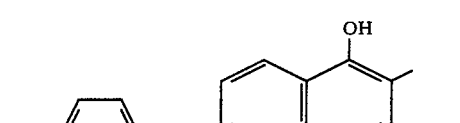

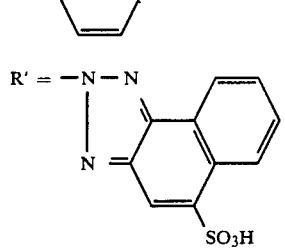

is obtained.

Further suitable coupling components are those mentioned in Tables 1e and 2c.

Instead of 3-methylaniline, it is also possible to use 2,5-dimethoxyaniline, 2-methoxy-5-methylaniline, 2,5-dimethylaniline, 3-acetylaminoaniline, 1-naphthylamine, 1-amino-2-ethoxynaphthalene-6-sulphonic acid or anilinomethanesulphonic acid etc.

(d) If the corresponding bromine or cyano compound is used in 12b and (c) instead of the chlorine compound from 12a, analogous dyestuffs are obtained.

Analogously, the use of 2-aminonaphthalene-6-sulphonic acid in 12a, reduction, diazotization and coupling onto phenyl I acid give the isomeric dyestuff:

EXAMPLE 13

The known compound of the following formula obtained by coupling of diazotized 4-amino-4,-nitrostilbene-2,2'-disulphonic acid onto 1-aminonaphthalene-4-sulphonic acid analogously to the procedures in Houb-

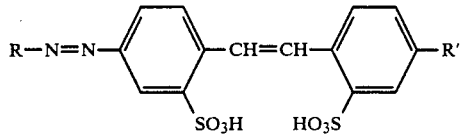

-continued

R = 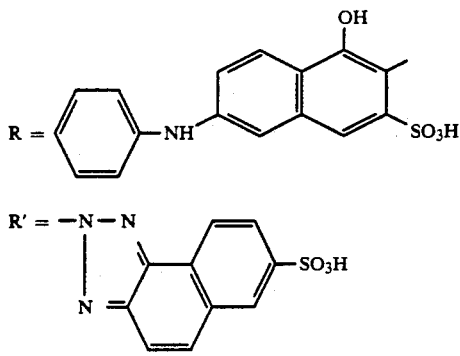

R' = 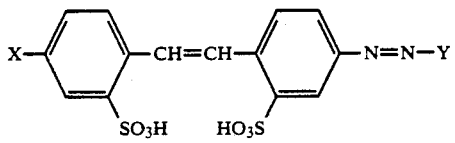

We claim:
1. Light-polarizing films or sheets containing dyestuffs which, in the form of the free acid, conform to the formula

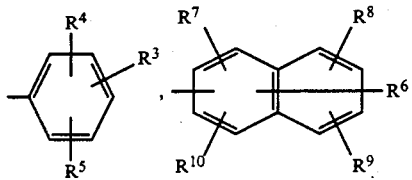

in which
X signifies —CN, —CF$_3$, halogen, R$^1$CONH—, —COOH, —CONH$_2$, —CONHR$^1$, —CONR$^1$R$^2$, —COOR$^1$, —OH, —OR:, —O—CO—R$^1$, —N=N—Y$^1$, or a substituted or unsubstituted heterocyclic radical,
R$^1$, R$^2$ signify alkyl, cycloalkyl, aryl or aralkyl, which may be interrupted by O and/or S, and
Y, Y$^1$ signify a substituted or unsubstituted aryl or heterocyclic radical.
2. Light-polarizing films or sheets containing dyestuffs of claim 1 in which
Y, R$^1$ are (A—N=N)$_p$L in which
A is a substituted or unsubstituted phenylene or naphthalene radical,
L is a substituted or unsubstituted phenyl or naphthyl radical and
p is 1, 2, or 3.
3. Light-polarizing films or sheets containing dyestuffs of claim 1 where
Y, Y$^1$ are

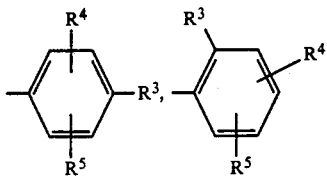

in which
R$^3$ signifies H, —OH, —OR$^1$, —NH$_2$, —NHR$^1$, —NR$^1$R$^2$, —NH—COR$^1$, —O—COR$^1$, —N=N=R$^{11}$, a heterocyclic radical,
R$^4$, R$^5$, R$^7$, R$^8$, R$^9$, R$^{10}$ signify H, halogen, —OH, —OR$^1$, —NH$^1$R$^2$, —NHR$^1$, —NR$^1$R$^2$, —R$^1$, —SO$_3$H, —NH—CO—R$^1$, O—CO—R$^1$, —SO$_2$—NH$_2$, —SO$_2$—NHR$^1$, —SO$_2$—NR$^1$R$^2$,
R$^6$ signifies H, —N=N=R$^{11}$, a heterocyclic radical and
R$^{11}$ signifies a substituted or unsubstituted aryl radical, preferably a substituted or unsubstituted phenyl or naphthyl radical or a substituted or unsubstituted heterocyclic radical containing a maximum of 8 azobridges.
4. Light-polarizing films or sheets containing dyestuffs of claim 1 in which
Y, Y$^1$ and R$_{11}$ are radicals from the benzene series of the formula

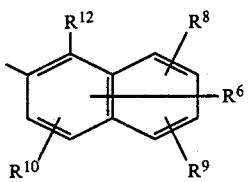

or radicals from the naphthalene series of the formulae

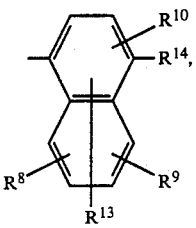

in which
R$^{12}$——OH, —NH$_2$

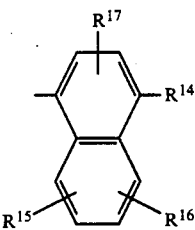

R$^{13}$ is H, if R$^{14}$=—N=N—R$^{11}$ or H, and is —N=N—R$^{11}$, if R$^{14}$=—OH, —NH$_2$,
R$^{14}$ is —OH, —NH$_2$, —N=N—R$^{11}$,

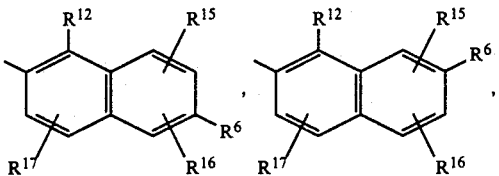

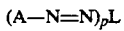

$R^{15}$, $R^{16}$ are H, —OH, —OR$^1$, —O—COR$^1$, —NH$_2$, —NH—R$^1$, —NHR$^1$R$^2$, —NH—CO—R$^1$, —SO$_3$H, $R^{17}$ is H, —SO$_3$H, in particular of the formulae

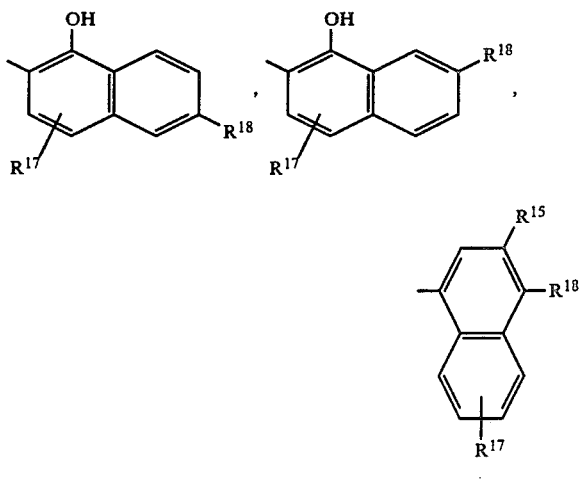

in which
$R^{18}$ denotes H, OH, NH$_2$, —NH—CO—R$^1$, —NH—R$^1$, —N=N—R$^{11}$, —SO$_3$H,

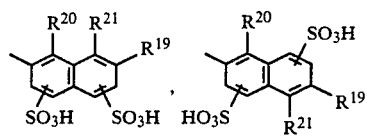

in which
$R^{19}$ denotes H, —N=N—R$^{11}$,
$R^{20}$, $R^{21}$ denote OH, NH$_2$, —O—CO—R$^1$, —NH—CO—R$^1$,

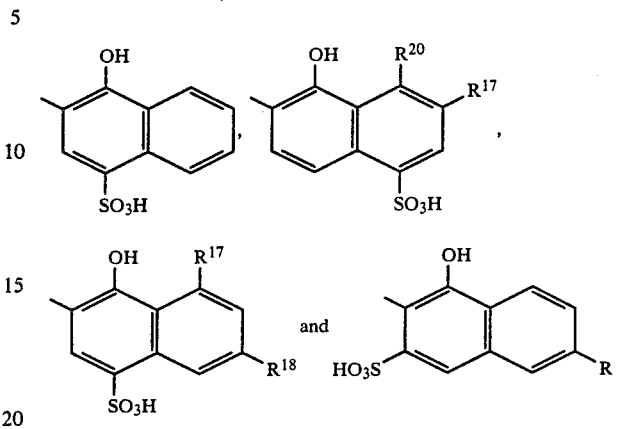

in which R is NH—R$^1$, —NH—CO—R$^1$, —N=N—R$^{11}$.

5. Light-polarizing films or sheets according to claim 1 containing dyestuffs of the formula

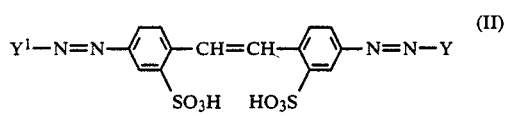

wherein Y$^1$ has the same structure as Y.

6. Films and sheets according to claims 1-5 containing dyestuffs of the formula

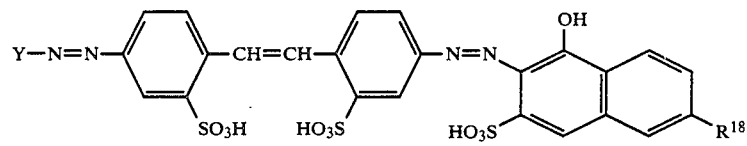

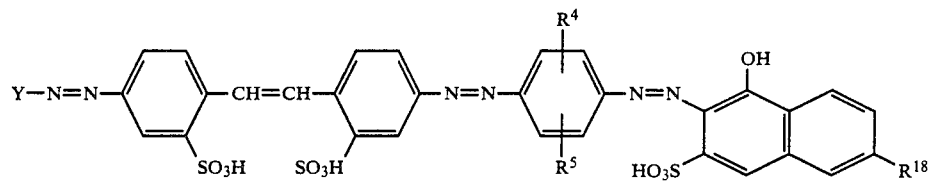

or

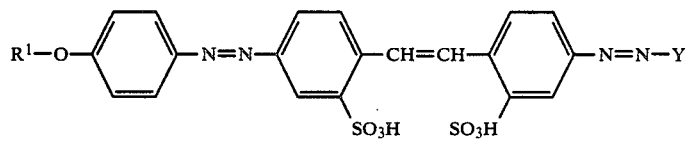

* * * * *

UNITED STATES PATENT AND TRADEMARK OFFICE
CERTIFICATE OF CORRECTION

PATENT NO. : 5,007,942
DATED : April 16, 1991
INVENTOR(S) : Claussen et al.

It is certified that error appears in the above-identified patent and that said Letters Patent is hereby corrected as shown below:

Col. 29, line 32    Delete " OR: " and substitute -- $OR^1$ --

Col. 29, line 41    Delete " $R^1$ " and substitute -- $Y^1$ --

Col. 29, last line    Delete " $-NH^1R^2,$ " and substitute -- $-NH_2,$ --

Col. 30, line 36    Delete " $R^{12}-$ " and substitute -- $R^{12}=$ --

Col. 32, claim 6 line 1    Delete " claims 1-5 " and substitute -- claim 1 --

Signed and Sealed this

Sixth Day of April, 1993

*Attest:*

STEPHEN G. KUNIN

*Attesting Officer*  Acting Commissioner of Patents and Trademarks